July 1, 1952     A. R. BOATES     2,601,838
MILEAGE LUBRICATION INDICATOR
Filed May 15, 1948
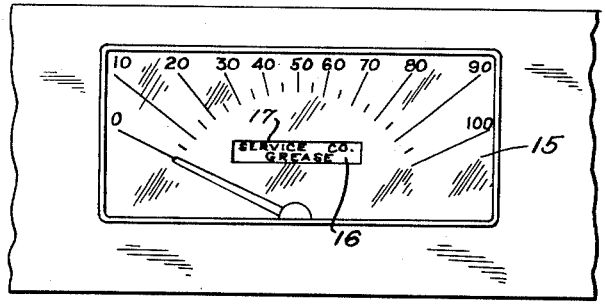
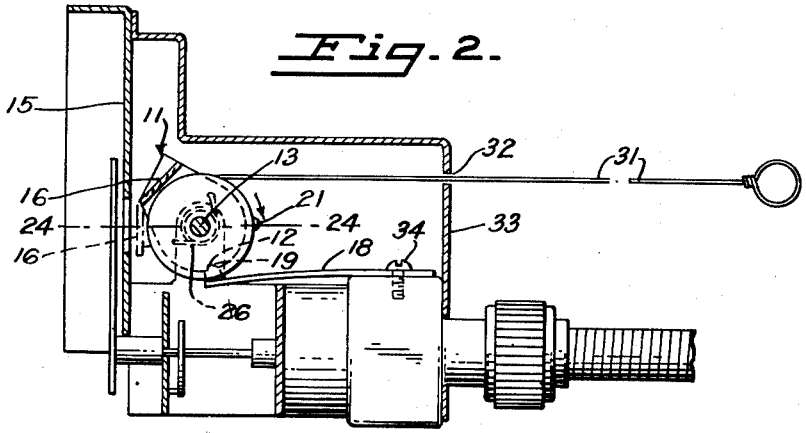
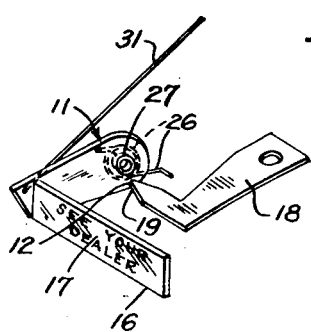
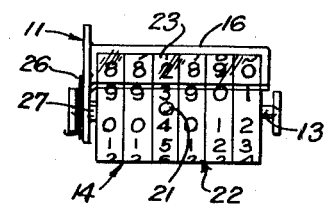
INVENTOR.
ARTHUR R. BOATES
BY
ATTORNEY

Patented July 1, 1952

2,601,838

UNITED STATES PATENT OFFICE 2,601,838

MILEAGE LUBRICATION INDICATOR

Arthur R. Boates, Mill Valley, Calif.

Application May 15, 1948, Serial No. 27,344

1 Claim. (Cl. 116—114)

The invention, in general, relates to the maintenance of driven mechanical elements, equipment or devices, such as motor vehicles, aeroplanes, engines and motors generally, as well as shafts and other parts thereof. More particularly, the invention relates to an improved indicator for such operable units to call attention to the necessity of servicing thereof, by lubrication or greasing and the like.

Heretofore, there has been some attention devoted to the development and provision of lubrication or service indicators particularly in the automotive art, wherein such indicators have been, in general, associated with the speedometer of the vehicle for actuation by the shaft thereof. These prior indicators, for the most part, are of relatively complex construction and, because of necessary gearing not only take up appreciable space but are somewhat expensive on the whole to manufacture as well as to maintain. Because of their complex construction they are also difficult to assemble and install with speedometers of predetermined size and construction. The present invention is directed to an improved indicator which obviates inherent difficulties and disadvantages of prior constructions heretofore marketed.

While my present invention is entirely suitable for adaptation to a wide variety of equipment, devices and moving or operable elements which require frequent lubrication and servicing to prolong their useful life, the present device has been especially devised for adaptation to motor vehicles and I have, accordingly, illustrated and shall describe the same in that environment.

A primary object of the invention is to provide an improved lubrication indicator of relatively simple construction which affords periodic notice to motor vehicle operators of the necessity for lubrication or other service for vehicle maintenance.

Another object of my invention is to provide an improved mileage lubrication or service indicator of the aforementioned character which is inexpensive to manufacture and to install, and which requires but nominal maintenance expense, if any.

A still further object of the present invention is to provide an improved indicator of the designated nature which has a minimum number of parts with no rotating elements and requiring no bearings, gearing or other heavy duty members.

Other objects of the invention, together with some of the advantageous features thereof, will appear from the following description of a preferred embodiment of the invention which is illustrated in the accompanying drawings. It is to be understood that I am not to be limited to the precise embodiment shown, nor to the precise arrangement of the various parts thereof, as my invention, as defined in the appended claim, can be embodied in a plurality and variety of forms.

Referring to the drawings:

Fig. 1 is a front elevational view of a portion of the preferred embodiment of my invention in one operative position thereof as applied to an odometer of a motor vehicle.

Fig. 2 is a sectional elevational view, partly in dotted line showing, of the preferred embodiment of the invention as installed on a motor vehicle for actuation by the odometer thereof.

Fig. 3 is a perspective view of the major elements of the preferred embodiment of the invention, independent of its installation or assembly with an actuating unit.

Fig. 4 is an elevational view of the same portion of the preferred embodiment of the invention which is illustrated in Fig. 1, but in another of its positions.

In its preferred form, the lubrication or service indicator of my invention, as applied to motor vehicles, preferably comprises, in combination with an odometer of the motor vehicle, a notched member movably mounted adjacent to the shaft of said odometer, a detent engaging the notch of said member, a plate carried by said member; said plate bearing indicia for alerting the motor vehicle operator as to lubrication or other service for the vehicle, together with means on said odometer for moving said detent to disengage said notched member, and means for urging said notched member from one position to another after being disengaged by said detent.

As particularly illustrated in Figures 2 and 3 of the annexed drawings, and as applied to a motor vehicle for actuation by the odometer thereof, my improved lubrication or service indicator preferably includes a notched member 11 which preferably is fabricated from a suitable plastic material, such as tenite or other phenolic or urea condensate, but which can also be manufactured of wood or a light-weight metal such as aluminum or the like. The member 11 preferably is formed with but a single notch 12 therein and, for purposes of utility in connection with motor vehicles, conveniently is loosely or freely mounted on the shaft 13 of the odometer of the motor vehicle in which it may be installed, so that the member 11 is not rotated or moved with the rotation or movement of the odometer shaft 13 but wholly relative thereto. The member 11 carries on one end thereof, which is the forward end when considered in connection with the face plate 15 of the odometer 14, a plate 16 on which is delineated any desired indicia 17, such as the name of a dealer in automotive parts, lubricants and greases, or the legend "Lubricate," or the legend "See Your Dealer" or similar notice which alerts the operator of the motor vehicle that the vehicle has been driven such a distance as to require service for effective maintenance of the vehicle.

In accordance with my invention, I provide a detent 18 carrying a tooth 19 which engages or seats in the notch 12 of the notched member 11 under all conditions except when a given number of miles have been traveled by the motor vehicle, as indicated or counted by the odometer of the vehicle, at which time or on the happening of such event the detent 18 is tripped by means of a button, peg or other element 21 which is carried on the exterior of one of the rotating discs, odometer 14 of the motor vehicle. Generally, it is the practice to change the oil in the crankcase of a motor vehicle every one thousand miles as well as to lubricate various parts of the chassis and wearing members of the vehicles. Therefore, the button 21 may be secured to the exterior of the 1,000 mile disc 23 of the odometer so that as the odometer discs pass from 999 miles to 1,000 miles the button 21 will engage and depress the detent 18 whereupon the tooth 19 thereof disengages the notch 12 of the notched member 11 permitting movement thereof. I have illustrated in Fig. 4 of the accompanying drawings the position of plate 16 of the indicator during travel of the motor vehicle for a distance of 999 miles and it will be noted that the plate 16 lies above the minor axis 24, as indicated by the line 24—24 in Fig. 2. However, when the button 21 depresses the detent 18 as the distance of travel of the motor vehicle approaches and reaches 1,000 miles of travel, movement of the notched member 11 will bring the plate 16 carried thereby into a position on line 24 or on the minor axis of the odometer, or into the position indicated in Fig. 1 of the drawings which is in the sight opening of the odometer in the face thereof. Consequently, the indicia or legend borne by the plate 16 is brought into the vision of the motor vehicle operator. As explained hereinafter, this legend on the plate 16 is brought into the vision of the operator of the vehicle every 1,000 miles after each lubricating or service job on the vehicle.

Any suitable means can be employed for so moving the notched member 11 into the position where the indicia 17 on plate 16 becomes visible to the vehicle operator at periodic intervals and when the detent has been depressed to permit movement of such notched member. In the present embodiment of the invention this automatic movement of the notched member is effected by the action of a spring 26 which is coiled about a collar or sleeve 27 serving to mount the notched member loosely or freely on the shaft 13 of the speedometer 14, with one end of the spring 26 engaging or anchored to a part, not shown, of the frame or housing of the odometer. This coiling of spring 26 on the collar 27 effects the urging of the notched member 11 toward the front or face of the odometer but the influence of the spring 26 normally is overcome by the engagement of the detent 18 with the notched member 11 through the medium of the notch 12 of the member 11 and the tooth 19 of the detent. When the detent 18 is depressed, at the expiration of a predetermined distance travelled by the motor vehicle, the notched member 11 automatically moves in an arc to carry the plate 16 thereof into the position shown in Fig. 1 of the drawings.

In order to provide for withdrawal of the plate 16 from its position at the sight opening in the face of the odometer after a service has been made on the vehicle, or a lubricating job has been done, I furnish a length of cable or wire 31 which is secured to the notched member 11 by slipping one end of the wire 31 through a hole provided in the member 11 and which has a knot at one extremity thereof at such opening to firmly attach the wire to the member. The opposite or free end of the wire 31 is passed through an opening 32 formed in the rear wall of the housing 33 of the odometer and permitted to hang down below the same at the rear of the instrument panel of the vehicle. By pulling on wire 31 the notched member 11 is drawn rearwardly and to a distance as will effect the engagement of the notch 12 of the member 11 with the tooth 19 of detent 18, the latter being a resilient strip which springs back to its initial position after being depressed by the button 21. The detent 18 conveniently can be secured by means of a screw 34 piercing the detent and a boss 36 at the rear of the odometer housing, as shown in Fig. 2. The pulling of wire 31 is done by a service man after a servicing has been done on the vehicle. In other words, the indicia or legend 17 on plate 16 of the notched member 11 of my improved indicator device will remain at the sight opening of the odometer face until the vehicle operator takes the vehicle into a dealer for service and until the service man withdraws the plate 16 from the sight opening by pulling on wire 31. If desired, the plate 16 can be made of transparent material with the indicia or legend 17 delineated thereon in red, orange or other vivid color contrasting with the usual black numerals on the discs 22 of the odometer with the result that the vehicle operator can see somewhat through the transparent sheet or plate 16 and be advised of the mileage travelled by the vehicle at all times, notwithstanding the fact that the plate 16 remains in the sight opening of the face of the odometer. This distraction, however, would not remain long for the vehicle operator is continually confronted with the notice for servicing the vehicle, and normally would run the car into a dealer to take care of needed servicing.

It is to be understood that while I have intimated that the button 21 be placed or carried by the 1,000 mile disc 23 of the odometer, such button can be carried by the 100 mile disc or other disc of the odometer, as desired. And while I have illustrated and described the invention in connection with motor vehicles and in conjunction with the odometer thereof, it is to be understood that the invention has equal application with but slight changes well within those skilled in the art to other environments, such as in aeroplanes, or in warning operators of motor-generator sets of the necessity of affording service to such units.

It is to be understood that the appended claims are to be accorded a range of equivalents commensurate in scope with the advance made over the prior art.

I claim:

In a lubrication indicator for vehicles, the combination of an odometer, a drive shaft for operating said odometer, a plurality of odometer discs secured to and movable with said shaft, a member mounted on said shaft for movement relative thereto; said member having a notch therein, an indicia bearing plate on said member; said plate being adapted to be brought into the vision of the vehicle operator upon movement of said member, a detent element normally in engagement with said notch of said member to restrain said member against movement, a compression spring anchored at one end to the casing of said odometer and engaging said member at its other end; the compression of said spring being relieved when said detent is dislodged from the notch of said member to cause the spring to move said member and thereby to bring said indicia bearing plate into the vision of the vehicle operator, and a button secured to the exterior of one of said odometer discs and movable into engagement with said detent to dislodge said detent from the notch of said member at the expiration of a predetermined distance of travel of the vehicle as indicated by the movement of said odometer disc to which said button is secured.

ARTHUR R. BOATES.

REFERENCES CITED

The following references are of record in the file of this patent:

UNITED STATES PATENTS

| Number | Name | Date |
|---|---|---|
| 1,948,427 | Moecker | Feb. 20, 1934 |
| 2,130,613 | Colee | Sept. 20, 1938 |
| 2,253,827 | Vinton | Aug. 26, 1941 |